(12) United States Patent
Li

(10) Patent No.: US 11,562,497 B1
(45) Date of Patent: *Jan. 24, 2023

(54) AUTOMATIC FIELD OF VIEW DETECTION

(71) Applicant: X Development LLC, Mountain View, CA (US)

(72) Inventor: Yueqi Li, San Jose, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/482,029

(22) Filed: Sep. 22, 2021

Related U.S. Application Data

(63) Continuation of application No. 16/227,319, filed on Dec. 20, 2018, now Pat. No. 11,151,737.

(51) Int. Cl.
*G06T 7/55* (2017.01)
*G06T 7/246* (2017.01)
*G06V 10/75* (2022.01)

(52) U.S. Cl.
CPC ............... *G06T 7/55* (2017.01); *G06T 7/248* (2017.01); *G06V 10/751* (2022.01); *G06T 2207/10016* (2013.01); *G06T 2207/30241* (2013.01); *G06T 2207/30242* (2013.01); *G06T 2207/30252* (2013.01); *G06V 10/759* (2022.01)

(58) Field of Classification Search
CPC ............................ G06F 16/434; H04N 9/3194
USPC ..................................... 348/135, 180, 222.1
See application file for complete search history.

(56) References Cited

U.S. PATENT DOCUMENTS

| | | |
|---|---|---|
| 2008/0030711 A1 | 2/2008 | Iizuka |
| 2012/0105825 A1 | 5/2012 | Gogolla et al. |
| 2016/0119541 A1 | 4/2016 | Alvarado-Moya et al. |
| 2018/0120847 A1 | 5/2018 | Chen |
| 2018/0189574 A1 * | 7/2018 | Brueckner ........... G06V 10/235 |
| 2018/0324403 A1 | 11/2018 | Boyd et al. |
| 2019/0094149 A1 | 3/2019 | Troy et al. |

OTHER PUBLICATIONS

Sadreddini, et al. "A distance measurement method using single camera for indoor environments." In Telecommunications and Signal Processing (TSP), 2016 39th International Conference on, pp. 462-465. IEEE.

Suh, et al. "A cooperative localization algorithm for mobile sensor networks." In Automation Science and Engineering (CASE), 2012 IEEE International Conference on, pp. 1126-1131. IEEE.

(Continued)

*Primary Examiner* — Kiet M Doan
(74) *Attorney, Agent, or Firm* — Gray Ice Higdon

(57) ABSTRACT

Implementations are described herein for analyzing a sequence of digital images captured by a mobile vision sensor (e.g., integral with a robot), in conjunction with information (e.g., ground truth) known about movement of the vision sensor, to determine spatial dimensions of object(s) and/or an area captured in a field of view of the mobile vision sensor. Techniques avoid the use of visual indicia of known dimensions and/or other conventional tools for determining spatial dimensions, such as checkerboards. Instead, techniques described herein allow spatial dimensions to be determined using less resources, and are more scalable than conventional techniques.

16 Claims, 5 Drawing Sheets

(56) References Cited

OTHER PUBLICATIONS

Duffy, et al. "Application of spatial cross correlation to detection of migration of submarine sand dunes." Journal of Geophysical Research: Earth Surface 110, No. F4; 11 pages; Dated 2005.

Shi, et al. "GPS-supported visual SLAM with a rigorous sensor model for a panoramic camera in outdoor environments." Sensors 13, No. 1; pp. 119-136; Dated 2013.

Czajewski, et al. "Vision-based vehicle speed measurement method." In International Conference on Computer Vision and Graphics, pp. 308-315. Springer, Berlin, Heidelberg, Dated 2010.

Kim, et al "Distance measurement using a single camera with a rotating mirror." International Journal of Control, Automation, and Systems 3, No. 4; pp. 542-551; Dated Dec. 2005.

Shukla, et al. "Image Based Distance Measurement Technique for Robot Vision using New LBPA approach." International Journal of Novel Research in Electrical and Mechanical Engineering 2, No. 1; pp. 22-35. Dated 2015.

Li; et al. "Mobile robot self-localization system using single webcam distance measurement technology in indoor environments." Sensors 14, No. 2; pp. 2089-2109; Dated 2014.

Royer, et al. "Monocular Vision for Mobile Robot Localization and Autonomous Navigation." International Journal of Computer Vision, Springer Verlag, 74 (3), pp. 237-260. <10.1007/s11263-006-0023-y>. <hal-01635679>. Dated 2007.

Parekh, Kayton B., "A Computer Vision Application to Accurately Estimate Object Distance". Mathematics, Statistics, and Computer Science Honors Projects. 18; 109 pages; https://digitalcommons.macalester.edu/mathcs_honors/18 Dated 2010.

Shukla, Neha "A Review on Image Based Target Distance & Height Estimation Technique Using Laser Pointer and Single Video Camera for Robot Vision." International Journal of Engineering Research and Reviews vol. 3, Issue 1 pp. 128-135. Dated 2015.

Cristofalo, et al. "Localization of a Ground Robot by Aerial Robots for GPS-deprived Control with Temporal Logic Constraints." In International Symposium on Experimental Robotics, pp. 525-537. Springer, Cham. Dated 2016.

Mirisola, et al. "Tracking from a moving camera with attitude estimates." ICR08; 9 pages; Dated 2008.

* cited by examiner

AUTOMATIC FIELD OF VIEW DETECTION

BACKGROUND

Vision sensors such as cameras inherently have fields of view ("FOV") that represent the area covered by the vision sensor's lens' angle of view. However, the spatial dimensions captured by the FOV may vary depending on a variety of factors, such as how far away the vision sensor is from the object(s) being captured, an angle between the vision sensor and the object(s) being captured, etc. There are many scenarios in which it is desirable to determine spatial dimensions of object(s) captured in a FOV and/or of the FOV itself. For example, mobile robots and/or other autonomous/semi-autonomous vehicles are often equipped with cameras configured to capture multiple images of the environment. These may be used for navigation, mapping, and/or measurements of other geographic areas.

Techniques exist for determining spatial dimensions of object(s) captured in the FOV and/or of an area captured in the FOV, such as utilizing visual indicia having known dimensions (e.g., measuring stick), other objects of known spatial dimensions, so-called "checkerboard" processing, stereo camera calibration techniques (which require two lenses), and so forth. However, these techniques tend to be cumbersome, unreliable (especially in the absence of visual indicia of known spatial dimensions), and not generally scalable.

SUMMARY

Implementations disclosed herein are directed to analyzing a sequence of digital images captured by a mobile vision sensor (e.g., integral with a robot), in conjunction with information (e.g., ground truth) known about movement of the vision sensor, to determine spatial dimensions of object(s) and/or an area captured in a FOV of the mobile vision sensor. Techniques described herein avoid the use of visual indicia of known dimensions and/or other conventional tools for determining spatial dimensions, such as checkerboards. Instead, techniques described herein allow spatial dimensions to be determined using less resources and are more scalable than conventional techniques.

In various implementations, a sequence of digital images captured by a vision sensor integral with a robot may be obtained. This sequence may be analyzed in real time, or it may be obtained and then analyzed after the fact, e.g., from a database in which images captured by the robot are stored. The vision sensor (and hence, the digital images it captures) may take various forms, such as an RGB camera, a vision sensor that also captures depth data (e.g., a "2.5D" vision sensor or camera), an infrared camera, or any other vision sensor that produces digital images having pixels (or voxels).

Techniques described herein may have a wide variety of applications. In some implementations, techniques described herein may be used to analyze digital images captured by a vision sensor integral with a robot. Such a robot may take various forms, such as a ground-based mobile robot that uses mechanisms such as wheels, casters, robotic limbs, and/or tracks to move around, an unmanned aerial vehicle (sometimes referred to as a "drone"), a satellite, and so forth. Techniques described herein may also be applicable, for instance, with digital images captured by vision sensors mounted on cars (e.g., autonomous or semi-autonomous), trucks, boats, trains, etc.

In some implementations the sequence of digital images may include a sequence of distinct digital images acquired at a set frequency, such as a video feed. However, the frequency at which the digital images are acquired need not necessarily be captured at frequencies typically associated with video feeds. It is sufficient that the digital images be captured at a frequency in which at least some portions of digital images of the sequence depict overlapping areas and/or environmental features.

In various implementations, spatial dimensions of object(s) and/or areas captured by a vision sensor may be determined by calculating a geographic distance represented by each pixel of a digital image, also referred to herein as a "geographic distance per pixel." Once the geographic distance per pixel for one or more digital images is known, various spatial dimensions, such as a spatial dimension of an area captured by a vision sensor of a robot, may be determined.

Geographic distances per pixel may be determined in various ways. In some implementations, two or more digital images of a sequence of digital images captured by a robot's vision sensor may be analyzed. These two or more images may or may not be consecutive digital images of the sequence. Based on the analysis, one or more regions of overlapping pixels between the two or more digital images may be identified. These regions of overlapping pixels may depict the same object(s) and/or area. The other regions of the two or more digital images that do not overlap may depict different object(s) and/or areas from each other. In some implementations, a "measure of pixel overlap" may be determined. This may include, for instance, a count of overlapping pixels along a particular (e.g., linear) dimension, such as along a line in the digital images that is parallel to a trajectory travelled by the robot between acquisition of the two or more digital images.

Intuitively, as a robot moves in a particular direction while capturing a video stream, at least some portion of the environment may be visible within the vision sensor's FOV across two or more frames of the video stream. In some cases, the robot's vision sensor may be pointed towards a ground surface underneath the robot, e.g., if the robot is performing mapping operations. Thus, a particular portion or common area of the ground surface will likely be depicted by pixels of two or more digital images captured by the vision sensor. The remaining pixels of the two or more digital images may be distinct. In set theory terminology, areas of pixels of two or more digital images that depict at least a portion of the same captured image may comprise an intersection pixels of the two or more digital images. The remaining pixels of each image that depict different areas may comprise disjoint subsets of pixels of the two or more digital images.

These regions of pixels that capture the same common area may be leveraged, e.g., in conjunction with information known about the robot's movement, to determine a geographic distance per pixel. For example, in some implementations, a geographic distance moved by the vision sensor of a robot along a trajectory between acquisitions of the two or more digital images may be determined. This geographic distance may be determined in various ways, such as using output of a Global Positioning System ("GPS") sensor integral with the robot, inertial measurement units ("INU") tracked by the robot or control system of the robot, wireless triangulation using one or more wireless transmitters of the robot (e.g., Wi-Fi, Bluetooth, ZigBee, Z-Wave, etc.), and so forth.

Based on the geographic distance moved by the robot along the trajectory and the measure of pixel overlap, it is possible to calculate a geographic distance per pixel. For example, in some implementations, the geographic distance per pixel may be calculated by dividing the geographic distance moved by the robot along the trajectory by the measure of pixel overlap. One the geographic distance per pixel is known, it can be used to determine various spatial dimensions associated with the FOV of the vision sensor, such as spatial dimensions of an area (e.g., the ground) captured by the vision sensor.

In some implementations, more than two digital images of a sequence may be analyzed to obtain a more accurate geographic distance per pixel. For example, suppose the number of pixel movements across multiple sequential digital images is known, along with the beginning and end GPS coordinates across the sequence. It is possible to calculate the geographic distance represented by each pixel with little error, e.g., by distributing errors of the first and last GPS coordinate to multiple images (GPS coordinates can be very accurate but often still have at least some error). In practice, it is possible to find a sequence with hundreds of digital images in which the first and last images are at least five meters apart. Since each digital image's real-time kinematic ("RTK") GPS coordinate may have, for instance, a twenty centimeter error, it is possible to distribute the total error of forty centimeters across the hundreds of digital images. Consequently, each image may have relatively little error. In some implementations, it is possible to compute spatial dimensions captured in a FOV across all digital images of a sequence and to determine a median captured spatial dimension of all FOVs for a single vision sensor.

Techniques described herein give rise to various technical advantages and benefits. As noted previously, conventional techniques that relied on visual indicia with known dimensions (e.g., tape measure) have limited scalability and may be cumbersome, particularly where no spatial indicia having known dimensions are available. Techniques described herein, on the other hand, allow for spatial dimensions to be determined using only multiple images captured by a vision sensor and information known about movement of the vision sensor. They are more scalable (e.g., less computationally expensive) and available in a wider variety of scenarios. Thus, techniques described herein can be employed to help otherwise resource-constrained robots contribute to mapping operations that may be performed, for instance, as part of simultaneous localization and mapping ("SLAM") operations. Moreover, techniques described herein, especially when performed across large numbers of digital images of a sequence, may reduce the impact of position coordinate error that is often inherent, e.g., in GPS measurements, and enable hands-off deployment of robots (e.g., because an operate need not manually perform conventional techniques for calibration).

The above is provided as an overview of some implementations disclosed herein. Further description of these and other implementations is provided below.

In some implementations, a method performed by one or more processors is provided that includes: obtaining a sequence of digital images captured by a vision sensor integral with a robot while the vision sensor moves along a trajectory; analyzing two or more digital images of the sequence to identify one or more regions of pixels between the two or more digital images of the sequence that depict a common area; based on the one or more regions of pixels, determining a measure of pixel overlap between the two or more digital images; determining a geographic distance moved by the vision sensor along the trajectory between acquisition of the two or more digital images; calculating a geographic distance per pixel based on the geographic distance moved by the vision sensor along the trajectory and the measure of pixel overlap; and determining a dimension of a space captured in a field of view of the vision sensor based on the geographic distance per pixel.

These and other implementations of technology disclosed herein may optionally include one or more of the following features.

In various implementations, the measure of pixel overlap may include a count of pixels of the one or more regions of pixels. In some such implementations, the count of pixels of the one or more regions of pixels may include a count of a line of pixels across the one or more regions of pixels that depict a common area. In various implementations, the line of pixels may be parallel to at least a portion of the trajectory.

In various implementations, the vision sensor may be mounted to the robot such that the vision sensor captures a surface on which the robot moves along the trajectory. In some such implementations, the common area may be a portion of the surface captured by the vision sensor. In various implementations, the robot may take the form of an aerial vehicle, and the vision sensor may be mounted to the robot such that the vision sensor captures a ground surface beneath the robot as the vision sensor moves along the trajectory.

In various implementations, the two or more digital images may include a first digital image and a second digital image with a first region of pixels that depict the common area. The method may further include analyzing the second digital image and a third digital image of the sequence that follows the second digital image to identify one or more additional regions of pixels between the second and third digital images of the sequence that depict at least a portion of the same common area or a different common area. In some such implementations, the measure of pixel overlap may be a first measure of pixel overlap, and the method may further include: based on the one or more additional regions of pixels that depict the same common area or the different common area, determining a second measure of pixel overlap between the second and third digital images. In various implementations, determining the geographic distance per pixel may be further based on the second measure of pixel overlap. In various implementations, determining the geographic distance per pixel may be based on a sum of the first and second measures of pixel overlap. In various implementations, determining the geographic distance per pixel may be based on an average of the first and second measures of pixel overlap.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combina-

DETAILED DESCRIPTION

Figure 1:
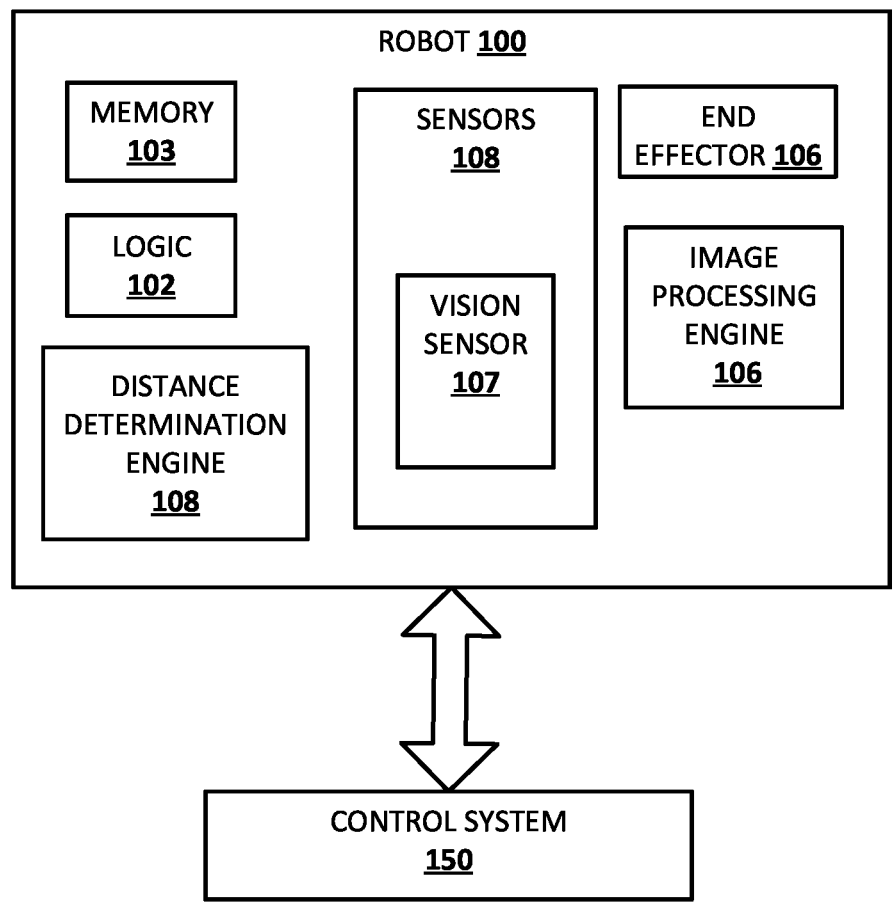
FIG. 1 schematically depicts an example environment in which disclosed techniques may be employed in accordance with various implementations.

Now turning to FIG. 1, a schematic diagram of an example environment in which selected aspects of the present disclosure may be practiced in accordance with various implementations is illustrated. A robot 100 may be in communication with a control system 150. Robot 100 may take various forms, including but not limited to a telepresence robot (e.g., which may be as simple as a wheeled vehicle equipped with a display and a camera), a robot arm, a humanoid, an animal, an insect, an aquatic creature, a wheeled device, a submersible vehicle, a unmanned aerial vehicle ("UAV"), and so forth. Additionally or alternatively, robot 100 may take the form of an autonomous or semi-autonomous vehicle. In various implementations, robot 100 may include logic 102. Logic 102 may take various forms, such as a real time controller, one or more processors, one or more field-programmable gate arrays ("FPGA"), one or more application-specific integrated circuits ("ASIC"), and so forth. In some implementations, logic 102 may be operably coupled with memory 103. Memory 103 may take various forms, such as random access memory ("RAM"), dynamic RAM ("DRAM"), read-only memory ("ROM"), Magnetoresistive RAM ("MRAM"), resistive RAM ("RRAM"), NAND flash memory, and so forth.

In some implementations, logic 102 may be operably coupled with one or more end effectors 106 and/or one or more sensors 108. As used herein, "end effector" 106 may refer to a variety of tools that may be operated by robot 100 in order to accomplish various tasks. For example, end effector 106 may include a device that captures one or more images. In some implementations, the end effector 106 can also include one or more other effectors in addition to or in lieu of a vision sensor 107, as illustrated in FIG. 1. Other types of end effectors may include but are not limited to drills, brushes, force-torque sensors, cutting tools, deburring tools, welding torches, containers, trays, fluid nozzles, and so forth. In some implementations, end effector 106 may be removable, and various types of modular end effectors may be installed onto robot 100, depending on the circumstances.

Sensors 108 may take various forms, including but not limited to vision sensor 107. Vision sensor 107 may be a 3D laser scanner or other 3D vision sensors (e.g., stereographic cameras used to perform stereo visual odometry) configured to provide depth measurements, two-dimensional cameras, "2.5D" cameras, light sensors (e.g., passive infrared), etc. In addition to an vision sensor 107, sensors 108 may include force sensors, pressure sensors, pressure wave sensors (e.g., microphones), proximity sensors (also referred to as "distance sensors"), depth sensors, torque sensors, bar code readers, radio frequency identification ("RFID") readers, radars, range finders, accelerometers, gyroscopes, compasses, position coordinate sensors (e.g., global positioning system, or "GPS"), speedometers, edge detectors, and so forth. While only one sensor 108 is shown depicted as being integral with robot 100, this is not meant to be limiting. In some implementations, sensors 108 may be located external to, but may be in direct or indirect communication with, robot 100, e.g., as standalone units or as part of control system.

Control system 150 may include one or computing systems connected by one or more networks (not depicted) that control operation of robot 100 to various degrees. An example of such a computing system is depicted schematically in FIG. 5. In some implementations, control system 150 may be operated by a user (not depicted) to exert a relatively high level of control over robot 100, e.g., in real time in response to signals received by a user interface and/or one or more readings from one or more sensors 108. For example, a user may interact with a graphical user interface rendered on a display (e.g., CRT, LCD, touchscreen, etc.) to interactively "jog" various components of the robot in various directions, e.g., by providing robot 100 with one or more input velocities for robot 100 itself and/or end effector 106.

Figure 2:
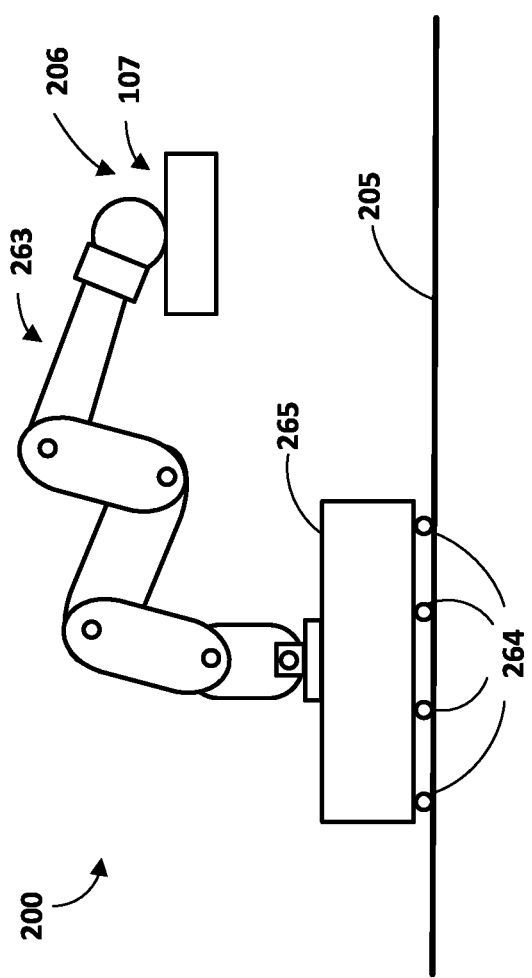
FIG. 2 depicts one example of how disclosed techniques may be practiced, in accordance with various implementations.

Referring to FIG. 2, an image is provided that depicts one example robot 200 that may be utilized to implement how techniques disclosed herein may be practiced. Robot 200 includes an arm 263 that includes a plurality of joints to allow the arm 263 to move into various positions. In this example, six joints are indicated. However, this is not meant to be limiting, and robots may have any number of joints. An end effector 206 in the form of a vision sensor 107 is attached to a sixth joint. One or more of the joints of arm 263 may move into a position such that visual sensor 107 moves along a horizontal trajectory and/or is positioned to scan a vertical trajectory, such as a wall. Robot 200 also includes a base 265 that includes one or more wheels 264 to allow the robot 200 to move in one or more directions. In some implementations, robot 200 may include alternate configurations to allow the robot 200 to move. Thus, in addition to moving the arm 263 to scan a surface, movement of the robot 200 and/or the vision sensor 107 may be aided by wheels 264.

Figure 3B:
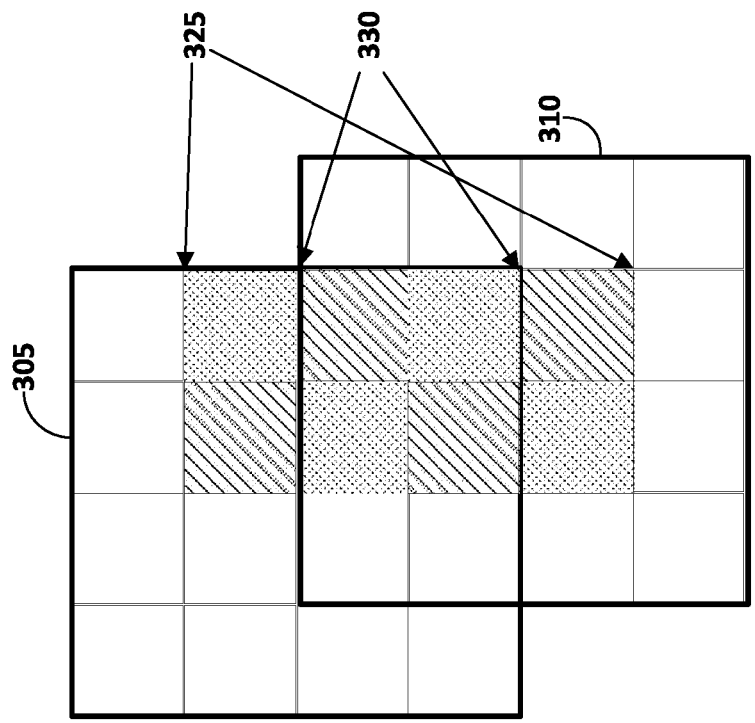
FIG. 3B depicts an example of multiple images that include each include at least a portion of the same geographic area with the regions of pixels aligned.
Figure 3A:
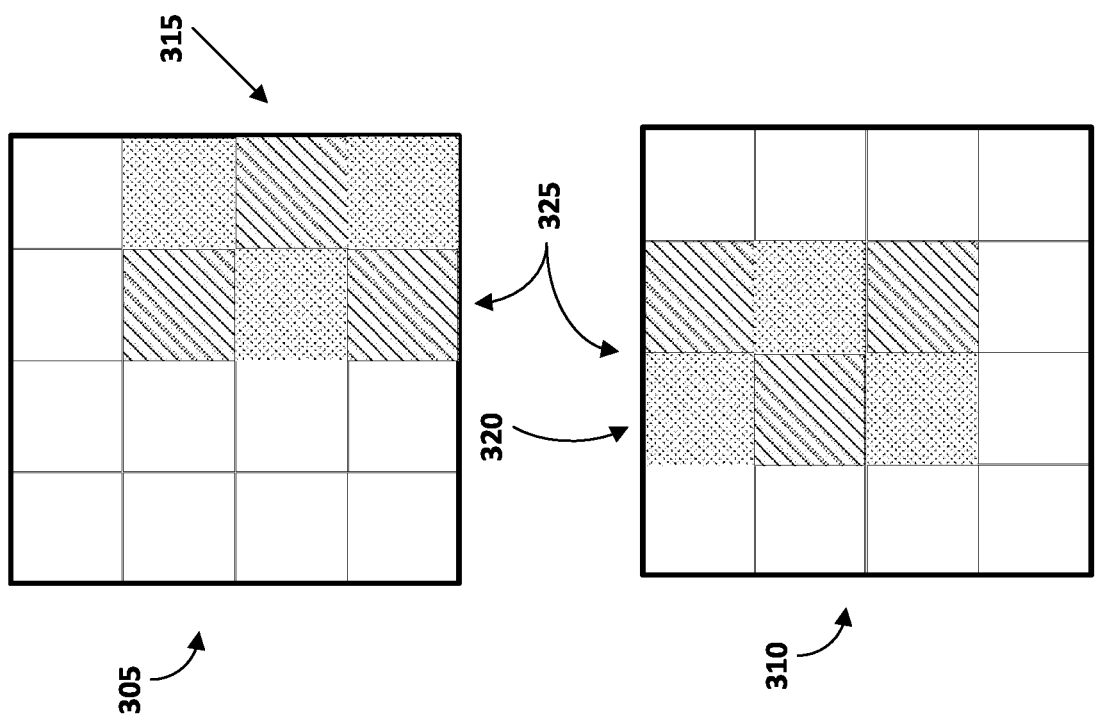
FIG. 3A depicts an example of multiple images that include at least a portion of the same geographic area.

Vision sensor 107 may capture digital images, such as the images depicted in FIGS. 3A and 3B. As used herein, "digital images" and "images" both refer to a captured representation of a physical field of view with a matrix of pixels, each pixel depicting a representation a portion of the physical field of view. Referring again to FIG. 2, an image may be captured by the vision sensor 107 while the joints of arm 263 are in a first configuration, then the positioning of one or more of the segments of arm 263 may be changed to a second configuration while maintaining the same distance from a surface. Also, for example, the wheels 264 may propel the robot 200 along a trajectory from a first position to a second position. As another example, the robot may be a component of an aerial vehicle (an airplane, helicopter, drone, etc.) and the first and second images may be captured while the vehicle is at a first coordinate and at a second coordinate once the vision sensor 107 moves to a new position.

FIGS. 3A and 3B demonstrate an example of how techniques described herein may be performed to calculate spatial dimensions of, for example, a FOV of vision sensor 107. In this example, suppose that vision sensor 107 has captured a first image 305 and a second image 310, and that first and second images 305, 310 overlap such that at least a portion of a common area 325 is captured in each image. Common area 325 is depicted in its entirety in FIG. 3B and includes eight pixels arranged in two columns and four rows. Although the common area 325 is illustrated as a rectangle (e.g., representing an area rug), any marking and/or visually distinguishable common area may be captured by regions of pixels in each image to identify the common regions of pixels that depict the same portion of an area or object.

Although the example of FIGS. 3A and 3B includes two images, any number of images may be utilized. For example, a third image may overlap with second image 310 and may be utilized to perform one or more of the operations disclosed herein. Each of the captured images 305 and 310 are comprised of a 4 by 4 matrix of pixels. In practical practice of image capture, these images would likely include a much larger array of pixels to improve resolution of the images. However, for simplicity in explanation, a significantly lower resolution is illustrated in the figures. In some implementations, the images 305 and 310 may include, for example, visible light images, infrared images, and/or any image capture method that allows vision sensor 107 to identify and distinguish objects and/or markings on a surface.

As noted previously, images 305 and 310 both depict portions of common area 325. FIG. 3B depicts both images 305 and 310 in a slightly overlapping arrangement, so that the entirety of common area 325, which includes eight pixels (two columns, four rows), is visible in FIG. 3B. As illustrated in FIG. 3A, image 305 includes, in six pixels at bottom right, a first portion 315 of common area 325. Second image 310, which may have been captured slightly before or after first image 305, includes six pixels that define a second portion 320 of common area 325. As illustrated in FIG. 3B, the first image 305 and the second image 310 have an overlapping region 330 that depicts the same portion of the common area 325 and portions of each of the images that is not depicted in the opposite image (i.e., the first image 305 depicts a portion of the common area 325 that is not depicted in the second image 310, and the second image 310 depicts a portion of the common area 325 that is not depicted in first image 305).

Image processing engine 106 receives images from the vision sensor 107 to analyze the images. In some implementations, image processing engine 106 identifies one or more regions of pixels from each image that depict a common area. For example, referring to FIG. 3A, image processing engine 106 may utilize any number of known techniques for image recognition to identify the borders of the common area 325 based on the portions (315, 320) of the common area 325 captured in images 305 and 310.

Image processing engine 106 can determine a measure of the overlap between the first image (305) and the second image (310). In some implementations, the measure of pixel overlap may be determined based on the number of pixels that are common to the images. For example, referring to FIGS. 3A-B, a region (330) of four pixels is common to both images (i.e., the middle four pixels of the common area 325). In some implementations, the count of pixels may be a count of pixels in a line of pixels across the region that is common to both images. For example, referring again to FIG. 3B, the region of pixel overlap is comprised of two rows and two columns, thus the count of pixels can be either a count in a row or in a column.

As previously described, more than two overlapping images may be utilized. Thus, image processing engine 106 may determine a region of overlap between a first image and a second image and further determine a region of overlap between the second image and a third image. Therefore, image processing engine 106 can determine a second region of overlap that includes at least a portion of the second image and a portion of the third image.

Although the two images of FIG. 3A are not precisely aligned, in some implementations, at least a portion of the regions of pixels may be parallel to at least a portion of the trajectory of the vision sensor. For example, the last row of image 305 may align with the last row of image 310 such that the region of overlap between images may include pixels in the last row of image 305 aligning with pixels in the last row of image 310.

As previously discussed, more than two images may be utilized to perform techniques described herein. Thus, referring again to FIG. 3B, a third image may include a region of overlapping pixels with image 310 and/or with image 305. Further, in some implementations, a third image may capture an area that overlaps at least in part with areas captured by both image 305 and images 310. For example, a third image may be acquired that captures a common area that is present in all three images.

Distance determination engine 108 determines a geographic distance moved by robot 100/200. For example, image 305 may be captured when the vision sensor 107 is at a first geographic location. The vision sensor 107 may then be moved a distance that can be determined and the second image 310 may be captured. For example, the control system 150 may determine, based on instructions provided to the robot 100/200 to move the position of the vision sensor 107, a location of the vision sensor at a first position when the first image was captured and a second location where the second image was captured based on one or more instructions provided by control system 150 to the robot 100/200. Alternatively or additionally, distance determination engine 108 may determine the geographic distance traversed by the vision sensor based on, for example, GPS locations determined at the time each image was captured, calculations of the distance traveled by wheels 264, calculations of the locations of the vision sensor 107 when the arm 263 is in a first position and a second position, and/or any other techniques that determine a distance traveled by the vision sensor 107.

Distance determination engine 108 calculates a geographic distance per pixel. The geographic distance per pixel is a measure of a distance represented by each pixel after determining the distance between the location where the first image was captured from the location where vision sensor 107 captured the second image. For example, suppose a vision sensor captures images that are each comprised of a matrix of 100 pixels by 100 pixels. Image processing engine 106 may determine that a measure of pixel overlap, po, between a first image captured by the vision sensor and a second image captured by the vision sensor is ten pixels, e.g., in a line that is parallel to the trajectory of the vision sensor. Further, distance determine engine 108 may calculate the distance d traveled by the vision sensor 107 between acquisition of the two digital images to be five meters based on identifying the location where the first image was captured and the location where the second image was captured, as previously discussed.

In various implementations, distance determination engine 108 may calculate a geographic distance per pixel, gdpp, of the two images to be 0.5 meters per pixel, e.g., using an equation such as equation (1):

$$gdpp = \frac{d}{po} \quad (1)$$

Additionally or alternatively, in implementations in which more than two digital images of a sequence are used to calculate a "cumulative" geographic distance per pixel, cgdpp, across the sequence, an equation such as equation (2) below may be employed, wherein $d_t$ represents a total distance travelled by the vision sensor between acquisition of the first and last digital images of the sequence, and $po_{i,i-1}$ represents a measure of pixel overlap between two images i and i−1 (which may or may not be consecutive) of the sequence:

$$cgdpp = \frac{d_t}{\sum_{i=1}^{n} po_{i,i-1}} \quad (2)$$

In some implementations, distance determination engine 108 can calculate multiple geographic distances per pixel for a given set of images. For example, a first geographic distance per pixel can be calculated for the region of overlap between a first image and a second image. Further, a second geographic distance per pixel can be calculated for a second region of overlap between the second image and a third image. In some implementations, distance determination engine 108 can determine the geographic distance per pixel based on an average of the first and second measures of pixel overlap. For example, one or more of the measurements described herein may differ slightly from image to image, which may result in different calculations for the geographic distance per pixel of the first region of overlap and the second region of overlap. Thus, an average of the two measures, a more accurate distance per pixel may be calculated by distance determination engine 108.

In some implementations, distance determination engine 108 may determine a dimension of a space captured in a field of view of the vision sensor based on the geographic distance per pixel of the image and a known resolution of the image (i.e., the number of pixels in each row of the image and the number of rows of pixels in the image). Since an image is comprised of a known number of pixels by a known number of pixels, each of which is a characteristic of the image, a spatial dimension of an area captured in a FOV of a vision sensor can be determined based on the geographic distance per pixel. Returning to the previous example, each image was comprised of 100×100 pixels. Further, a distance per pixel was calculated to be 0.5 meters per pixel (i.e., the distance along the trajectory that is represented by each pixel). Thus, based on these calculations, a field of view of the vision sensor is fifty meters (0.5 meters per pixel multiplied by the one hundred pixels across the image).

Figure 4:
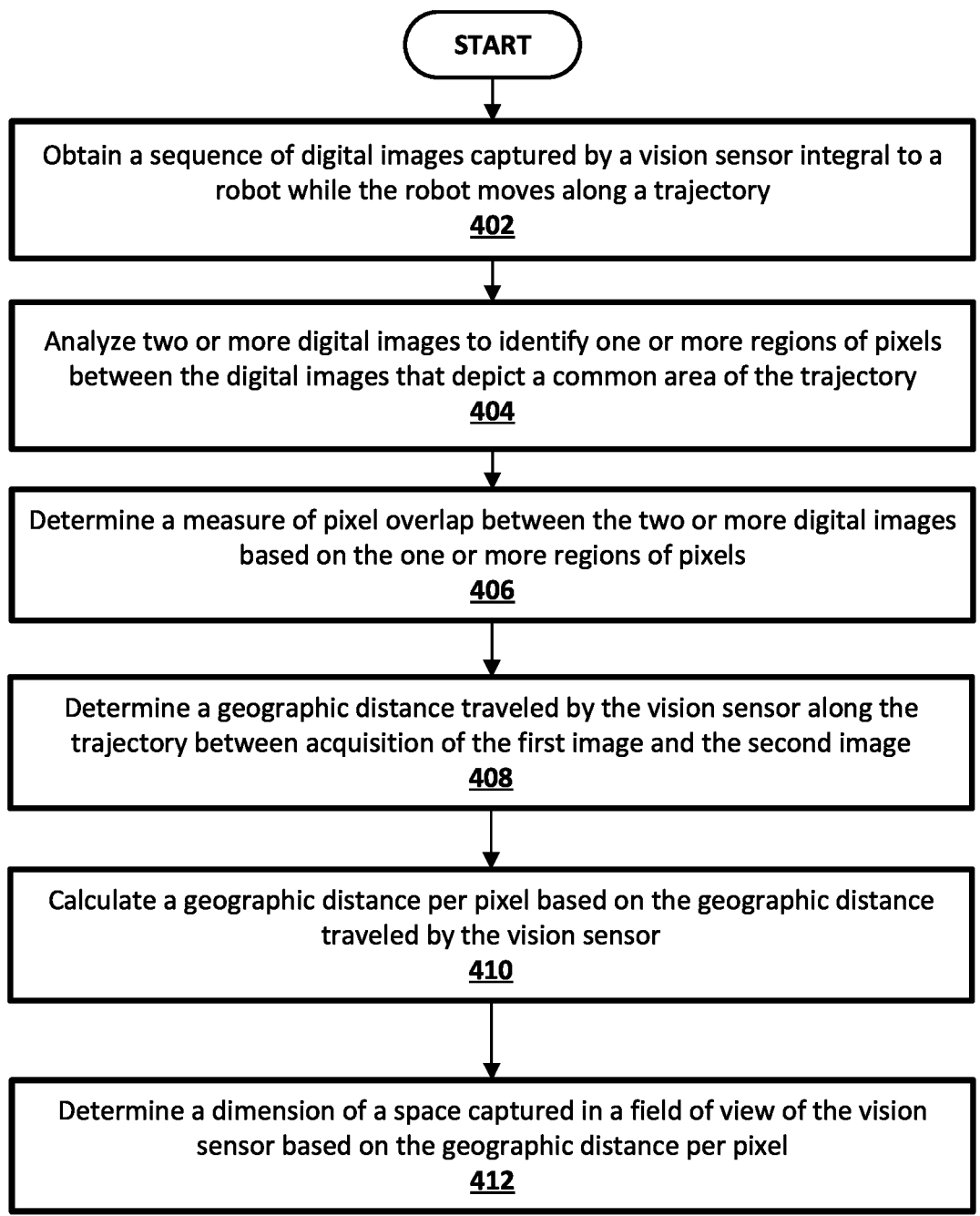
FIG. 4 is a flowchart of an example method in accordance with various implementations described herein.

Referring to FIG. 4, a flowchart is provided of an example method in accordance with various implementations described herein. For convenience, the operations of the flowchart are described with reference to a system that performs the operations. This system may include various components of various computer systems. For instance, some operations may be performed at robot 100, while other operations may be performed by one or more components of control system 150. Moreover, while operations of method 400 are shown in a particular order, this is not meant to be limiting. One or more operations may be reordered, omitted or added.

At block 402, a sequence of images are obtained that were captured by a vision sensor integral to a robot while the vision sensor moves along a trajectory. The robot may share one more characteristics of robot 200 of FIG. 2. For example, the robot may include an arm 263 with one or more sensors attached, such as the vision sensor. In some implementations, the robot may be mobile and the one or more images may be acquired by movement of the robot along the trajectory. In some implementations, the vision sensor may share one or more characteristics with vision sensor 107. For example, the vision sensor may be attached to a robotic arm 263 that allows the vision sensor 107 to move from a first position to a second position and capture images at each position. In some implementations, the vision sensor 107 may change positions as a result of an arm that the visual sensor changing position. In some implementations, the vision sensor may change position as a result of the robot changing positions (i.e. propelled along a trajectory by wheels attached to the robot and/or change in position of a vehicle to which the robot is attached).

At step 404, two or more digital images are analyzed to identify one or more regions of pixels between the images that depict a common area of the trajectory. The one or more regions may be identified by a component that shares one or more characteristics with image processing engine 106. In some implementations, two or more regions of pixels may be identified from three or more images. For example, a first region of common pixels may be identified between a first image and a second image and a second region of pixels may be identified between the second image and a third image. The image processing engine 106 may identify the pixels that constitute a common area based on, for example, image matching and/or boundary detection methods that identify at least a portion of the same object in multiple images and further identifying the portions of the images that are similar or identical.

At step 406, a measure of pixel overlap between the two or more digital images is determined based on the one or more regions of pixels that depict a common geographic area. The determination of the pixel overlap may be determined by a component that shares one or more characteristics with distance determination engine 108. In some implementations, the measure of pixel overlap comprises a count of pixels of the one or more regions of pixels. In some implementations, the measure of pixel count is based on the number of pixels in a line across the images. For example, a region of overlapping pixels may be based on a count of pixels across an area that depicts a common area when the line of pixels is parallel to at least a portion of the trajectory.

At step 408, a geographic distance traveled by the vision sensor along the trajectory between acquisition of the first image and the second image is determined. The geographic distance may be determined by a component that shares one or more characteristics with distance determination engine 108. The geographic distance travelled by the vision sensor may be determined based on, for example, a measurement of the distance travelled by wheels attached to the robot, a calculation based on the positioning of one or more joints of an arm that the vision sensor is attached, GPS calculations of the position of the vision sensor where each image was captured, and/or any other techniques for determining the distance between the location where a first image was captured and where a second image was captured.

At step 410, a geographic distance per pixel is calculated based on the geographic distance traveled by the vision sensor. The geographic distance per pixel (e.g., gdpp) may be determined by a component that shares one or more characteristics with distance determination engine 108. In some implementations, the geographic distance per pixel may be determined by comparing the distance travelled by the vision sensor along a trajectory with the number of pixels that depict the same common area between multiple images. For example, a geographic point may be represented by a pixel of a first image at one position and the same geographic point may be represented by a different pixel in a second image. Because the distance traversed by the vision sensor is known and the offset between pixels representing the geographic point across the images is known, a geographic distance per pixel may be determined by dividing the distance traversed by the vision sensor by the pixel offset of the geographic point between images, e.g., using equation (1) and/or (2) above.

At step 412, a dimension of a space captured in a field of view of the vision sensor is determined based on the geographic distance per pixel. The dimension of space may be determined by a component that shares one or more characteristics with distance determination engine 108. Because the distance per pixel has been determined, the distance for a series of pixels can be determined by multiplying the distance per pixel by the number of pixels in the field of view (i.e., the number of pixels between parallel sides of an image). For example, a distance per pixel may be determined to be two meters per pixel and the image has a resolution of 100 pixels by 100 pixels. The field of view would be 200 meters by 200 meters based on the distance per pixel and the number of pixels across the image.

Figure 5:
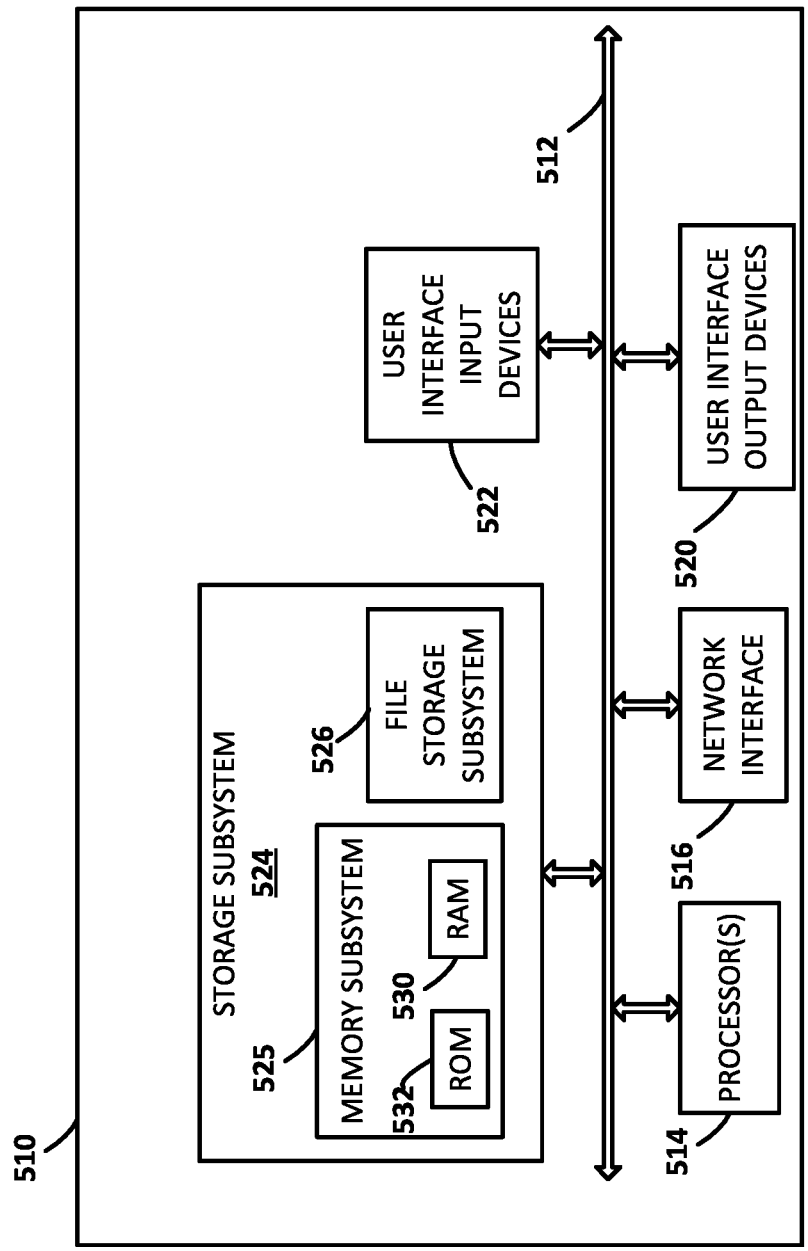
FIG. 5 schematically depicts an example architecture of a computer system.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the method described herein, as well as to implement various components depicted in FIG. 1.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 814.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 8 is intended only as a specific example for purposes of illustrating some implementations. Many other configurations of computing device 510 are possible having more or fewer components than the computing device depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
   obtaining a sequence of digital images captured by one or more vision sensors mounted on an arm of a ground-based vehicle, wherein each of the digital images is captured at a different location;
   analyzing two or more distinct digital images of the sequence captured at two or more distinct locations of the one or more vision sensors to identify one or more regions of pixels between the two or more distinct digital images of the sequence that depict a common area;
   based on the one or more regions of pixels that depict the common area, determining a measure of pixel overlap between the first digital image and the second digital image;
   calculating a distance traveled by the one or more vision sensors between the two or more distinct locations;
   calculating a geographic distance across each pixel based on the distance traveled by the one or more vision sensors and measure of pixel overlap; and
   determining a size of at least a portion of an object captured in fields of view of the one or more vision sensors based on the geographic distance across each pixel,
   wherein the ground-based vehicle travels along a path between a first geographic location where a first distinct image of the sequence is obtained and a second geographic location where a second distinct image of the sequence is obtained,
   wherein the geographic distance across each pixel is calculated further based on the first and second geographic locations.

2. The method of claim 1, wherein the measure of pixel overlap comprises a count of pixels of the one or more regions of pixels.

3. The method of claim 2, wherein the count of pixels of the one or more regions of pixels comprises a count of a line of pixels across the one or more regions of pixels that depict the common area.

4. The method of claim 3, wherein the line of pixels is parallel to at least a portion of a trajectory traveled by the vision sensor between the first and second joint configurations.

5. The method of claim 1, wherein the two or more digital images include a first digital image and a second digital image with one or more region of pixels that depict the common area, and the method further includes analyzing the second digital image and a third digital image of the sequence that follows the second digital image to identify one or more additional regions of pixels between the second and third digital images of the sequence that depict at least a portion of the same common area or a different common area.

6. The method of claim 5, wherein the measure of pixel overlap is a first measure of pixel overlap, and the method further comprises:
   based on the one or more additional regions of pixels that depict the same common area or the different common area, determining a second measure of pixel overlap between the second and third digital images;
   wherein determining the geographic distance per pixel is further based on the second measure of pixel overlap.

7. The method of claim 6, wherein determining the geographic distance per pixel is based on a sum of the first and second measures of pixel overlap.

8. The method of claim 6, wherein determining the geographic distance per pixel is based on an average of the first and second measures of pixel overlap.

9. A system comprising one or more processors and memory storing instructions that, in response to execution of the instructions, cause the one or more processors to:
   obtain a sequence of digital images captured by one or more vision sensors mounted on an arm of a ground-based vehicle, wherein each of the digital images is captured at a different location;
   analyze two or more distinct digital images of the sequence captured at two or more distinct locations of the one or more vision sensors to identify one or more regions of pixels between the two or more distinct digital images of the sequence that depict a common area;
   based on the one or more regions of pixels that depict the common area, determine a measure of pixel overlap between the first digital image and the second digital image;
   calculate a distance traveled by the one or more vision sensors between the two or more distinct locations;
   calculate a geographic distance across each pixel based on the distance traveled by the one or more vision sensors and measure of pixel overlap; and
   determine a size of at least a portion of an object captured in fields of view of the one or more vision sensors based on the geographic distance across each pixel,
   wherein the ground-based vehicle travels along a path between a first geographic location where a first distinct image of the sequence is obtained and a second geographic location where a second distinct image of the sequence is obtained,
   wherein the geographic distance across each pixel is calculated further based on the first and second geographic locations.

10. The system of claim 9, wherein the measure of pixel overlap comprises a count of pixels of the one or more regions of pixels.

11. The system of claim 10, wherein the count of pixels of the one or more regions of pixels comprises a count of a line of pixels across the one or more regions of pixels that depict the common area.

12. The system of claim 11, wherein the line of pixels is parallel to at least a portion of a trajectory traveled by the vision sensor between the first and second joint configurations.

13. The system of claim 9, wherein the two or more digital images include a first digital image and a second digital image with one or more region of pixels that depict the common area, and the system further comprises instructions to analyze the second digital image and a third digital image of the sequence that follows the second digital image to identify one or more additional regions of pixels between the second and third digital images of the sequence that depict at least a portion of the same common area or a different common area.

14. The system of claim 13, wherein the measure of pixel overlap is a first measure of pixel overlap, the system further comprising instructions to:
   based on the one or more additional regions of pixels that depict the same common area or the different common area, determine a second measure of pixel overlap between the second and third digital images;

wherein the geographic distance per pixel is further determined based on the second measure of pixel overlap.

15. The system of claim 14, wherein the geographic distance per pixel is determined based on a sum of the first and second measures of pixel overlap.

16. A non-transitory computer-readable medium comprising instructions that, in response to execution of the instructions by a processor, cause the processor to:
- obtain a sequence of digital images captured by one or more vision sensors mounted on an arm of a ground-based vehicle, wherein each of the digital images is captured at a different location;
- analyze two or more distinct digital images of the sequence captured at two or more distinct locations of the one or more vision sensors to identify one or more regions of pixels between the two or more distinct digital images of the sequence that depict a common area;
- based on the one or more regions of pixels that depict the common area, determine a measure of pixel overlap between the first digital image and the second digital image;
- calculate a distance traveled by the one or more vision sensors between the two or more distinct locations;
- calculate a geographic distance across each pixel based on the distance traveled by the one or more vision sensors and measure of pixel overlap; and
- determine a size of at least a portion of an object captured in fields of view of the one or more vision sensors based on the geographic distance across each pixel,
- wherein the ground-based vehicle travels along a path between a first geographic location where a first distinct image of the sequence is obtained and a second geographic location where a second distinct image of the sequence is obtained,
- wherein the geographic distance across each pixel is calculated further based on the first and second geographic locations.

* * * * *